United States Patent [19]

Mizuno et al.

[11] Patent Number: 5,045,513

[45] Date of Patent: Sep. 3, 1991

[54] SINTERED BODY OF SILICON NITRIDE AND ITS MANUFACTURE

[75] Inventors: Kenichi Mizuno, Nagoya; Katsuhisa Yabuta, Komaki; Masakazu Watanabe, Nagoya, all of Japan

[73] Assignee: NGK Spark Plug Co., Ltd., Aichi, Japan

[21] Appl. No.: 393,726

[22] Filed: Aug. 15, 1989

[30] Foreign Application Priority Data

Aug. 22, 1988 [JP] Japan ................. 63-206382

[51] Int. Cl.$^5$ .............................. C04B 35/58
[52] U.S. Cl. ..................... 501/98; 501/97; 264/65; 264/66; 423/344
[58] Field of Search ............ 501/96, 97, 98; 423/344; 264/65, 66

[56] References Cited

U.S. PATENT DOCUMENTS

| | | | |
|---|---|---|---|
| 4,218,257 | 8/1980 | Oda et al. | 501/97 |
| 4,609,633 | 9/1986 | Fukuhara et al. | 501/97 |
| 4,818,733 | 4/1989 | Shirai et al. | 501/97 |
| 4,820,665 | 4/1989 | Okai et al. | 501/97 |
| 4,830,991 | 5/1989 | Matsui et al. | 501/97 |
| 4,886,767 | 12/1989 | Goto et al. | 501/97 |

FOREIGN PATENT DOCUMENTS

| | | | |
|---|---|---|---|
| 0238184 | 9/1987 | European Pat. Off. | |
| 3743625 | 12/1986 | Fed. Rep. of Germany | |
| 0137873 | 7/1985 | Japan | 501/97 |
| 159259 | 7/1988 | Japan | |
| 2027346 | 2/1980 | United Kingdom | |

OTHER PUBLICATIONS

F. F. Lang, Dense Silicon Nitride Ceramics: Fabrication and Interrelations with Properties, pp. 597–613, Rockwell International Science Center.

G. Wotting and G. Ziegler, Dichtes Siliciumnitrid, II: Einflubfaktoren Bei der Herstellung und Gefugeentwicklung, Sprechsall, Fachberichte vol. 120, No. 2, 1987.

Hiroshi Horiguchi, Gosei Kaimenkasseizai (Synthetic Surfactants) published by Sankyo Syuppan K.K. (1962) (translation of Table of Contents).

*Primary Examiner*—William R. Dixon, Jr.
*Assistant Examiner*—Alan Wright
*Attorney, Agent, or Firm*—Sughrue, Mion, Zinn, Macpeak & Seas

[57] ABSTRACT

A sintered body of silicon nitride with high density, strength, toughness, and hardness, which can be used for a structural part of an engine, etc. The sintered body of the invention includes 80 to 94 wt % $Si_3N_4$, 2 to 10 wt % Mg compound calculated in MgO equivlent, and 2 to 10 wt % Y compound calculated in $Y_2O_3$ equivalent. The $Si_3N_4$ contains 5 to 40% $\alpha$-phase. The sintered body is manufactured in the following steps: (a) mixing powdery $Si_3N_4$ with a Mg compound and a Y compound in the above proportions, and then molding the mixture in which the $Si_3N_4$ powder contains 80% or more $\alpha$-phase and its grains are 1 $\mu$m or less in diameter on average; (b) performing primary sintering at 1,600° C. or less in an atmospher of nitrogen or of an inert gas at 20 atm or less; and (c) performing secondary sintering at 1,400° to 1,600° C. in an atmosphere of nitrogen or of an inert gas at 300 atm or more.

4 Claims, No Drawings

SINTERED BODY OF SILICON NITRIDE AND ITS MANUFACTURE

BACKGROUND OF THE INVENTION

This invention relates to a ceramic, and more i particularly, but not exclusively, to a sintered body of silicon nitride, with high density, toughness, and strength and also to its manufacture. This ceramic is appropriate for use in automobile engine parts (e.g., a ceramic rotor or a ceramic valve) or for use as wear parts (e.g., ball bearing).

Silicon nitride ($Si_3N_4$) ceramics have been receiving attention for use as structural or wear parts in apparatus that are operated at high temperatures (e.g., a high temperature gas turbine, a diesel engine, and an MHD generator) since they possess fairly high strength even at high temperatures, high chemical stability, and high thermal shock resistance.

Silicon nitride ceramics are dense sintered bodies generally prepared by the additions (e.g., $Y_2O_3$, $Al_2O_3$, or MgO) to powdery $Si_3N_4$ and then sintering the mixture because it is difficult to sinter powdery $Si_3N_4$ by itself. When $Y_2O_3$ or MgO is used as sintering additive, a sintered body is obtained in which $Si_3N_4$ particles are columnar crystals with high aspect ratios. A dense sintered body consisting of columnar crystals twined together, generally has a fairly high degree of strength and toughness. One example of such silicon nitride ceramics is disclosed in Japanese Published Unexamined Patent Application No.S60-137873.

General silicon nitride ceramics, however, have a problem: they do not possess sufficient strength and toughness to be used as structural parts, and their hardness could also be improved.

SUMMARY OF THE INVENTION

One object of this invention is to provide a sintered body of silicon nitride with high density, strength, toughness, and hardness.

An other object of the invention is to provide a simple and efficient method for manufacturing a sintered body of silicon nitride.

These and other related objects are realized by a sintered body of silicon nitride including 80 to 94wt%. $Si_3N_4$, 2 to 10wt% Mg compound calculated in MgO equivalent, and 2 to 10wt% Y compound calculated in $Y_2O_3$ equivalent. The $Si_3N_4$ is 5 to 40% α-phase.

These objects are also realized by a manufacturing method for a sintered body of silicon nitride including the following steps:

(a) mixing 80 to 94 wt%. powdery $Si_3N_4$ with 2 to 10wt% Mg compound calculated in MgO equivalent and 2 to 10 wt % Y compound calculated in $Y_2O_3$ equivalent, and then molding the mixture (the $Si_3N_4$ powder contains 80% or more α-phase $Si_3N_4$ in grains of 1μm diameter or less on average);

(b) performing primary sintering of the object molded in step (a) at 1,600° C. or less in an atmosphere of nitrogen or of an inert gas at 20 atm or less; and (c) performing secondary sintering of the body sintered in step (b) at 1,400° to 1,600° C. in an atmosphere of nitrogen or an inert gas at 300 atm or more.

The sintered body prepared in this way has excellent properties: high density, strength, toughness, and hardness.

DETAILED DESCRIPTION OF THE PREFERRED EMBODIMENTS

While being sintered, silicon nitride is transformed from α-phase to β-phase: that is, from granular grains to columnar ones with a high aspect ratio. In the present invention, silicon nitride used as a raw material contains more α-phase than β-phase; however the temperature in sintering is controlled so as to keep the α-phase within 5 to 40%, preferably within 5 to 30%, of the total silicon nitride. The sintered body of silicon nitride is thus a mixture of granular α-phase grains and columnar β-phase particles. Every grain of the β-phase is very fine because grain growth is difficult to occur during the sintering below 1,600° C. The sintered body obtained by this method becomes very dense and strong because of the fine particles of the β-phase, and the sintered body stays hard because some α-phase remains. If less than 5% of the sintered body of silicon nitride is α-phase, the hardness decreases; but on the other hands, if more than 40% of the sintered body is α-phase, the toughness as well as the strength decreases with the decrease of columnar β-phase grains.

The sintered body of the invention includes $Si_3N_4$, a Mg compound (e.g., MgO), and an Y compound (e.g., $Y_2O_3$). The Mg compound and Y compound (e.g., MgO and $Y_2O_3$), used as additions in sintering silicon nitride lower the temperature at which a glass phase that accelerates sintering occurs because $Si_3N_4$, MgO, and $Y_2O_3$ turn into a eutectic mixture, the melting point of which is lower than that of $Si_3N_4$. The additions also accelerate the production of columnar particles with a high aspect ratio. The sintered body contains 80 to 90 wt % (preferably 84 to 94 wt %) $Si_3N_4$, 2 to 10 wt % (preferably 3 to 8 wt %) Mg compound calculated in MgO equivalent and 2 to 10 wt % (preferably 3 to 8 wt %) Y compound calculated in $Y_2O_3$ equivalent. If $Si_3N_4$ is more than 94 wt % or if either MgO or $Y_2O_3$ is less than 2 wt %, sintering ability decreases, thus preventing the formation of a dense sintered body including at least some α-phase. If $Si_3N_4$ is less than 80 wt % or if either $Y_2O_3$ or MgO is more than 10 wt %, on the other hand, the additions are in excess so their effect is diminished, thus preventing the sintered body from becoming dense and masking the properties of silicon nitride. The sintered body acquires sufficient strength when its relative density is 98% or above; if the relative density is less than 98%, pores that form in the sintered body cause the strength to decrease.

The relative density in the present invention is given by the formula:

$$C / \left( \sum_{x=1}^{n} R_x \bigg/ \sum_{x=1}^{n} \frac{R_x}{C_x} \right)$$

C: the apparent density of the sintered body
$C_x$: the particle density of a component among the raw materials of the sintered body
$R_x$: the weight ratio of that component to the total weight of the raw materials
n: the number of components in the raw materials When the sintered body is 90vol% or more $Si_3N_4$ grains with a minor axis of 1 μm or less, the growth of the particles of β-phase is inhibited, and hence the sintered body obtained becomes dense and strong. If the proportion of $Si_3N_4$ grains with a minor axis of 1 μm or less is less than 90vol%, the inhibition of the growth of the particles is not sufficient, and the sintered body will not possess sufficient density and strength.

The sintered body obtained by the invention has the following qualities:

bending strength at room temperature-120 kgf/mm² or more, fracture toughness-6MN/m$^{3/2}$ or more, and Vickers hardness-1,500 kgf/mm² or more.

To prepare the sintered body, use powdery $Si_3N_4$ containing 80% α-phase or more. If the β-phase is more than 20%, most grains of the α-phase would be transformed into β-phase using the original β grains as nuclei in the sintering silicon nitride. A dense sintered body with at least some α-phase grains would thus not be formed. The average diameter of the $Si_3N_4$ powder used should be 1 μm or less since, if it is over 1 μm, not only will the sintering ability decrease but some grains of $Si_3N_4$ will grow abnormally during sintering, thus decreasing the strength of the sintered body obtained. Pure powdery $Si_3N_4$ containing 3 wt % impurities or less is preferable. The powdery Mg and Y compounds may be oxides, hydroxides, or salts such as carbonates, that can be changed into oxides while a sintered body is being prepared; but oxides are preferable. The purity of each Mg or Y compound is preferably 99 wt % or more.

$Si_3N_4$ powder, a Mg compound, and a Y compound are mixed in the following proportion: 80 to 94 wt % $Si_3N_4$, 2 to 10 wt % (preferably 3 to 8 wt %) Mg compound calculated in MgO equivalent, and 2 to 10 wt % (preferably 3 to 8 wt %) Y compound calculated in $Y_2O_3$ equivalent. The mixture is molded by a general method; for example, die press molding or hydrostatic pressure press molding. The molded object is sintered in two stages: a primary sintering at a low pressure, 20 atm or less; and a secondary sintering at a high pressure, 300 atm or more. The primary sintering is performed at a temperature of 1,600° C. or less in an atmosphere of nitrogen or of an inert gas at pressure of between 1 and 20atm., preferably between 1 and 10 atm. The nitrogen partial pressure is preferably 1 atm or more to suppress the decomposition of the $Si_3N_4$. If the pressure exceeds 20 atm, the resulting primary sintered body may consist of a shell with high density and a core with low density. If a low-density pocket remains inside after the primary sintering, it is impossible to make it dense in the secondary sintering since pores remain inside. If the temperature is over 1,600° C., the transformation of $Si_3N_4$ from α-phase to β-phase is accelerated, and β-phase grains start growing, thus creating an undesirable sintered body. The relative density of the primary sintered body should be 85% or more. The secondary sintering is then performed to obtain a sintered body with a higher density. The primary sintered body is again sintered in an atmosphere of nitrogen or of an inert gas at the pressure of 300 atm or more, here, the nitrogen partial pressure is preferably 1 atm or more. Even a primary sintered body that has not become sufficiently dense during the primary sintering at an ordinary or a low pressure will become dense because of compression caused by high pressure. The temperature during the secondary sintering is 1,400° to 1,600° C., preferably 1,450° to 1,550° C., to inhibit the growth of β-phase $Si_3N_4$ and to keep some α-phase.

Several examples of the invention are now described. Since many modifications may be made without departing from the scope of the invention, the examples listed below do not limit the invention to these examples, but simply illustrate the invention more clearly.

EXAMPLE 1

Powdery $Si_3N_4$ (average diameter 0.7 μm, α-phase content 90%, purity 98%), MgO (average diameter 1 μm, purity 99%) and $Y_2O_3$ (average diameter 3 μm, purity 99%) are mixed in the proportions shown in Table 1. After being dried, the mixed powder is molded by the hydrostatic press molding method at the pressure of 2ton/cm² to make molded objects of 50mm×50mm×20mm. The primary sintering of the molded objects is carried out for two hours under the conditions shown in Table 1, and the secondary sintering is carried out for two hours under high pressure.

The properties of the sintered bodies obtained are measured or calculated by the following methods, resulting in the values shown in Table 1.

(1) relative density: Archimedes Method

A solid is sunk into a liquid (e.g., an alcohol or benzene) in a graduated instrument (e.g., an graduated cylinder), and the volume V of the solid is obtained from the increase in the apparent volume of the liquid. The mass m of the solid is measured with a balance, and the density is calculated using the equation $\rho = m/V$.

relative density = density/theoretical density (2) bending strength: JIS(Japanese Industrial Standard)-R1601 Method A bar with a rectangular cross section (length 36 to 40 mm, width 4 mm, thickness 3 mm) is used for a three-point bending test. The three-point bending strength $\sigma_f$ is calculated with the equation $\sigma_f = 3PL/2bh^2$. Here, P denotes a fracture load (kgf), L the distance (mm) between fulcrums, b the width (mm) of a test bar, and h the thickness (mm) of the test bar.

(3) fracture toughness: Indentation Microfracture Method (also called the Indentation Fracture Method)

The magnitude of a crack caused by pressing a pressure element and the magnitude of the trace of the pressure element are measured, and the toughness $K_{IC}$ is then calculated. Here, the load is 30 kgf.

(4) Vickers hardness: 30 kgf load applied for 15 sec.

(5) α-phase content (%): X-ray diffraction α-phase content $(\%) = (I\alpha_{(102)} + I\alpha_{(210)})/(I\alpha_{(102)} + I\alpha_{(210)} + I\beta_{(101)} + I\beta_{(210)}) \times 100$ Here, for example, $I\alpha_{(102)}$ denotes a peak intensity of the index (102) of α-$Si_3N_4$ obtained by powder X-ray diffraction. (6) area occupation ratio of $Si_3N_4$ grains with the minor axis of 1 μm or less: observation with a scanning electron microscope of the $Si_3N_4$ grains of the specularly polished sintered body.

As shown in Table 1, the sintered body obtained in this example has excellent properties: high density, strength, toughness, and hardness. It has a relative density of 98% or more, an bending strength of 120 kgf/mm² or more at a room temperature, a fracture toughness of 6MN/m$^{3/2}$ or more, and a hardness of 1,500 kgf/mm² or more. All the comparison references in Table 1 have inferior properties.

The sintered bodies of the references 8 and 9 are not sufficiently dense even though the temperatures in the primary and secondary sinterings are high enough, and these samples do not contain any α-phase. The strength and hardness of their sintered bodies are thus low even though their toughness is 6MN/m$^{3/2}$ or more. Although the sintered bodies in references 10, 11, and 12 contain α-phase, their strength, toughness, and hardness are all low. The sintered bodies of references 13 and 14 have the same composition as sample 2 but their properties are inferior to those of sample 2.

the secondary sintering is performed at various temperatures as shown in Table 2. The properties of the sintered bodies obtained are shown in Table 2.

Table 2 shows that when the temperature in secondary sintering is too high, the α-phase content decreases,

TABLE 1

| | sample No. | composition (wt %) | | | conditions in primary sintering | | | conditions in secondary sintering | | |
|---|---|---|---|---|---|---|---|---|---|---|
| | | $Si_3N_4$ | MgO | $Y_2O_3$ | atmosphere | pressure (atm) | temperature (C.°) | atmosphere | pressure (atm) | temperature (C.°) |
| A | 1 | 94 | 9 | 3 | $N_2$ | 1 | 1600 | $N_2$ | 1500 | 1600 |
| | 2 | 88 | 6 | 6 | $N_2$ | 20 | 1500 | $N_2$ | 2000 | 1500 |
| | 3 | 80 | 10 | 10 | $N_2$ | 1 | 1450 | $N_2$ | 1000 | 1450 |
| | 4 | 89 | 4 | 7 | Ar + $N_2$ | 5 (4 + 1) | 1550 | Ar + $N_2$ | 1000 (500 + 500) | 1550 |
| | 5 | 90 | 6 | 4 | $N_2$ | 1 | 1500 | $N_2$ | 500 | 1500 |
| | 6 | 92 | 2 | 6 | $N_2$ | 10 | 1550 | Ar + $N_2$ | 305 (300 + 5) | 1600 |
| | 7 | 94 | 4 | 2 | $N_2$ | 1 | 1550 | $N_2$ | 2000 | 1550 |
| B | 8 | 96 | 3 | 1 | $N_2$ | 1 | 1600 | $N_2$ | 1000 | 1700 |
| | 9 | 94 | 1 | 5 | $N_2$ | 1 | 1700 | $N_2$ | 300 | 1600 |
| | 10 | 84 | 5 | 11 | $N_2$ | 1 | 1500 | $N_2$ | 2000 | 1600 |
| | 11 | 83 | 11 | 6 | $N_2$ | 1 | 1500 | $N_2$ | 2000 | 1500 |
| | 12 | 76 | 12 | 12 | $N_2$ | 1 | 1500 | $N_2$ | 2000 | 1500 |
| | 13 | 88 | 6 | 6 | $N_2$ | 20 | 1500 | $N_2$ | 2000 | 1650 |
| | 14 | 88 | 6 | 6 | $N_2$ | 20 | 1500 | $N_2$ | 2000 | 1800 |

| | sample No. | relative density g/cm³ | bending strength at room temperature kgf/mm² | facture toughness $MN/m^{3/2}$ | * | Vickers hardness kgf/mm² | α-phase content % |
|---|---|---|---|---|---|---|---|
| A | 1 | 98.8 | 147 | 7.6 | 94 | 1520 | 6 |
| | 2 | 99.5 | 155 | 7.2 | 100 | 1570 | 15 |
| | 3 | 99.1 | 128 | 6.7 | 100 | 1640 | 37 |
| | 4 | 99.7 | 158 | 7.4 | 98 | 1530 | 10 |
| | 5 | 99.3 | 142 | 7.1 | 100 | 1590 | 22 |
| | 6 | 99.2 | 138 | 7.4 | 95 | 1520 | 9 |
| | 7 | 99.4 | 136 | 7.0 | 98 | 1550 | 12 |
| B | 8 | 97.7 | 95 | 6.3 | 69 | 1410 | 0 |
| | 9 | 96.9 | 89 | 6.1 | 73 | 1400 | 0 |
| | 10 | 97.3 | 98 | 5.7 | 92 | 1460 | 11 |
| | 11 | 96.1 | 92 | 5.9 | 98 | 1430 | 20 |
| | 12 | 97.3 | 90 | 5.7 | 98 | 1480 | 17 |
| | 13 | 99.0 | 108 | 7.0 | 86 | 1460 | 3 |
| | 14 | 98.4 | 86 | 6.9 | 53 | 1420 | 0 |

A this invention
B comparison references
*area occupation ratio of $Si_3N_4$ particles with a minor axis of 1 μm or less

EXAMPLE 2

The sintered bodies of a powdery mixture of 92 wt % $Si_3N_4$, 4 wt % MgO, and 4 wt % $Y_2O_3$ are prepared in the same manner as example 1. The primary sintering is performed at 1,550° C. in 1 atm of $N_2$ for two hours, and a considerable amount of the $Si_3N_4$ grains grow to a minor axis of more than 1 μm, and the strength and hardness of the sintered body thus decrease.

TABLE 2

$Si_3N_4$:92 wt %, MgO:4 wt %, $Y_2O_3$:4 wt %
primary sintering conditions $N_2$ 1 atm · 1550° C. · 2 hr

| secondary sintering conditions | | | properties of the sintered body | | | | | | |
|---|---|---|---|---|---|---|---|---|---|
| atmosphere | pressure atm | temperature °C. | relative density g/cm³ | bending strength at room temperature kgf/mm² | fracture toughness $MN/m^{3/2}$ | Vickers hardness kg/m³ | α-phase content % | area occupation ratio of $Si_3N_4$ particles (%) minor axis of 1 μm or less | |
| $N_2$ | 1000 | 1500 | 99.7 | 157 | 7.1 | 1570 | 18 | 100 | this invention |
| | | 1600 | 99.4 | 138 | 7.3 | 1530 | 10 | 96 | this invention |
| | | 1700 | 99.0 | 112 | 7.0 | 1470 | 0 | 72 | comparison reference |

What is claimed is:

1. A sintered body of silicon nitride having a relative density of 98% or more, comprising 80 to 94 wt % $Si_3N_4$, 2 to 10 wt % compound calculated in MgO equivalent, and 2 to 10 wt % Y compound calculated in $Y_2O_3$ equivalent, wherein the $Si_3N_4$ contains 5 to 40% α-phase and the $Si_3N_4$ comprises grains 90 vol % or more of which have a minor axis of 1 μm or less.

2. A process for manufacture of a sintered body of silicon nitride comprising the steps of:
   (a) mixing 80 to 94 wt % powdery $Si_3N_4$ with 2 to 10 wt % Mg compound calculated in MgO equivalent and with 2 to 10 wt % Y compound calculated in $Y_2O_3$ equivalent, and then molding the mixture, in which the $Si_3N_4$ powder contains 80% or more α-phase, and the grains are 1 μm or less in diameter on average;
   (b) performing primary sintering of the molded object in step (a) at 1,600° C. or less in an atmosphere of nitrogen or nitrogen and an inert gas at 1 to 20 atm to provide a sintered body having a relative density of 85% or more; and
   (c) performing secondary sintering of the sintered body in step (b) at 1,400° to 1,600° C. in an atmosphere of nitrogen and an inert gas at 300 atm or more,
   such that 90 vol % or more of the grains in the sintered body produced have a minor axis of 1 μm or less.

3. A process for manufacture of a sintered body of silicon nitride as in claim 2 wherein said secondary sintering is conducted in an atmosphere of nitrogen and an inert gas, in which the nitrogen partial pressure in both the primary and secondary sintering is 1 atm or more.

4. A process for manufacture of a sintered body of silicon nitride as in claim 2 in which the temperature in the secondary sintering is in the range of 1,450° to 1,550° C.

* * * * *